United States Patent [19]
Cole et al.

[11] Patent Number: 5,271,035
[45] Date of Patent: Dec. 14, 1993

[54] REPEATER SUPERVISION

[75] Inventors: Robert J. Cole, Woolston; Christopher D. Stark, Sevenoaks, both of United Kingdom

[73] Assignee: STC Limited, London, England

[21] Appl. No.: 927,380

[22] Filed: Aug. 10, 1992

Related U.S. Application Data

[63] Continuation-in-part of Ser. No. 673,341, Mar. 22, 1991, abandoned.

[30] Foreign Application Priority Data

Apr. 11, 1990 [GB] United Kingdom ............... 9008219

[51] Int. Cl.⁵ ............................................. H04L 25/20
[52] U.S. Cl. ..................................... 375/3.1; 178/71 T; 371/20.2; 375/10
[58] Field of Search ................... 375/3, 3.1, 10; 370/13.1, 15; 455/9, 67.1; 178/71 T; 379/4, 5, 6; 371/5.1, 20.1, 20.2, 20.4, 20.5

[56] References Cited

U.S. PATENT DOCUMENTS

| | | | |
|---|---|---|---|
| 3,950,622 | 4/1976 | Taylor | 370/13.1 |
| 4,284,843 | 8/1981 | White | 178/71 T |
| 4,387,460 | 6/1983 | Boutmy et al. | 370/111 |
| 4,406,919 | 9/1983 | Pospischil | 178/71 T |
| 4,408,325 | 10/1983 | Grover | 370/110.4 |
| 4,635,260 | 1/1987 | Sestan | 375/3.1 |
| 5,060,226 | 10/1991 | Gewin et al. | 379/5 |

*Primary Examiner*—Benedict V. Safourek
*Attorney, Agent, or Firm*—Lee, Mann, Smith, McWilliams, Sweeney & Ohlson

[57] ABSTRACT

An arrangement for signalling to supervisory equipment in a repeater in a digital transmission system. A digital data test sequence comprising a plurality of multi-bit words each accompanied by a parity check bit is fed to the transmission systems. Digital supervisory signals modulate the test sequence and periodic parity violations are imposed on the test sequence. A first counter counts the periodic violations imposed on the test sequence and a second like counter counts errors in the test signals returned from the system.

7 Claims, 3 Drawing Sheets

REPEATER SUPERVISION

This application is a continuation-in-part of application Ser. No. 673,341 filed Mar. 22, 1991, now abandoned.

This invention relates to arrangements for digital supervision of repeaters in digital transmissions systems.

BACKGROUND OF THE INVENTION

In the transatlantic submarine optical fibre system designated TAT-9 the repeater supervisory sub-system provides monitoring facilities which aid submerged equipment fault location. It also enables switching between redundant laser transmitters and between redundant paths, in response to signals from a terminal. All functions except loopback are available with the transmission system in service so that incipient failures can be detected.

Typically the line code used in the system is 24B1P. That is, for every 24 binary data bits transmitted to line, a 25th bit is added, such that the 25-bit word has even mark parity. At the receive terminal, the parity condition can be checked to see if an error has occurred in any 25-bit word. The parity bit will indicate if an error has occurred, but not its position in the word.

The receive terminal is able to identify the position of the parity bit within the data stream by rather complex circuitry, but in the repeater a simple method has been devised which allows errors to be detected. This method is the subject matter of applicant's prior U.S. Pat. No. 4,121,195. Non return to zero (NRZ) data and clock are summed together to produce return to zero (RZ) pulses. These RZ pulses are passed through a divide-by-2 divider. For an even mark parity signal each word will generate even numbers of RZ pulses. Thus, provided there have been no errors, the output of the divider will always be in the same state at the time the parity bit has been processed. If the data bits are random, then the output for these bits will be random. Thus for 0 or 1 status at the output of the divider, there will be an average DC level with a small offset. The offset polarity will depend on the previous history. If a word with a single error is encountered, then there will be an odd number of pulses and hence the parity bit state will be reversed and so will the offset polarity. Provided no more errors occur the new offset state will be maintained. A low pass filter (LPF) is used to filter out high frequency components of the divider, and thus errors can be detected by noting the change in DC polarity at the output.

The arrangement just described can also be used to establish a communication channel as follows. If the integrity of the parity bits of the data is periodically violated at a slow rate at the terminal, then the offset at the output of the divider will follow these violations at the same slow rate. Periodic parity bit violation at the slow rate produces a tone which can be used as a carrier for supervisory commands.

In practice two different slow rates of signalling are used to provide two different tones, one for each direction of transmission.

The parity violations are affected intermittently so that the detected tone is modulated on and off at a predetermined pulse repetition frequency (PRF). Information may then be coded onto this carrier system by pulse width modulating the bursts of tone. For example:

| | | |
|---|---|---|
| '1' - Tone | on 7.9 mS | off 3.9 mS |
| '0' - Tone | on 3.9 mS | off 7.9 mS. |

Commands are sent to the repeaters as words which contain information on repeater to be addressed and facility required.

SUMMARY OF THE INVENTION

According to the invention there is provided an arrangement for signalling to supervisory equipment in a repeater in a digital transmission system, the arrangement including:
a) means for generating a digital data test sequence comprising a plurality of multi-bit words each accompanied by a parity check bit;
b) means for feeding said test sequence to the transmission system at the system transmission rate;
c) means for generating digital supervisory signals, and
d) means for imposing periodic inversions of bits of the test sequence in accordance with said supervisory signals whereby said supervisory signals modulate the imposed inversions,
said arrangement further including
e) a first frequency counter for counting the periodic violations imposed on the test sequence, and
f) a second like frequency counter for counting errors in test signals returned from the system.

BRIEF DESCRIPTION OF THE DRAWINGS

An embodiment of the invention will now be described with reference to the accompanying drawings, in which.

DESCRIPTION OF THE PREFERRED EMBODIMENTS

Figure 1:
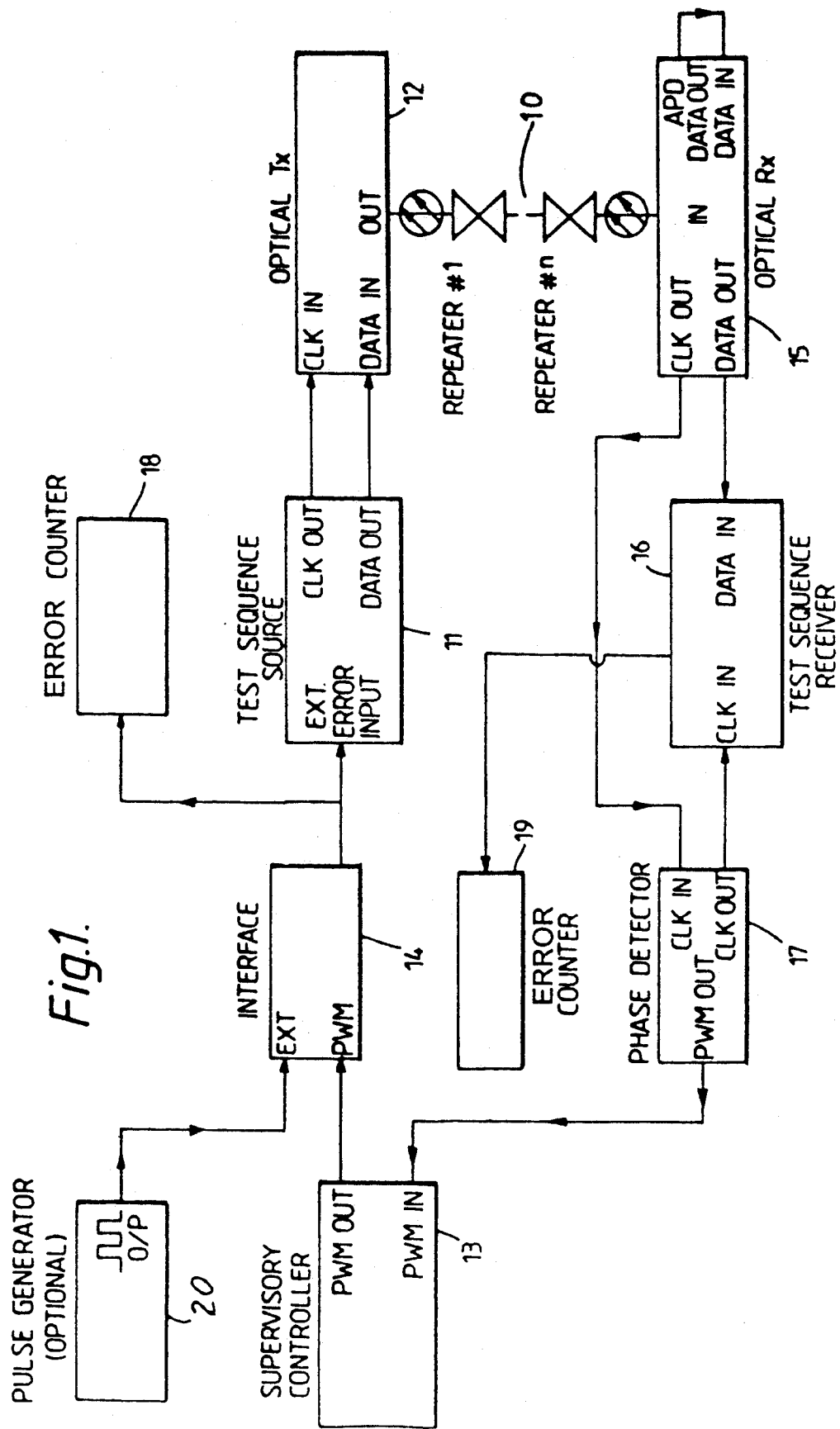
FIG. 1 is a block schematic illustration of a repeater supervision arrangement.

In the arrangement of FIG. 1 a test sequence source 11 is set up to provide a digital data test sequence, for example a 2000 bit sequence in which every 24 bits is accompanied by a parity bit. Typically the test sequence source comprises a programmable shift register arrangement, the contents of which are read out as data under control of an internal clock, which also provides a clock output. The clock and data outputs are applied to an optical transmitter 12 which feeds the data as optical digital signals to the transmission system, e.g. a repeatered submarine optical fibre system 10. The transmission system, which includes n repeaters, is remotely looped back so that signals from transmitter 12 are received back at optical receiver 15.

To provide telemetry and other supervisory signalling to the system repeaters controlled sequences of periodically occurring errors are imposed on the test sequence.

The controlled sequence of errors conform to a slow, pulse width modulated (PWM) digital coded data signal generated in supervisory controller 13. The PWM coded signals are applied to an interface circuit 14 where they control the output of a local clock source the frequency of which is such that it provides a signalling tone. This signalling tone is thus modulated in accordance with the PMW supervisory signalling code. Details of the tone modulation have been given above.

Figure 3:
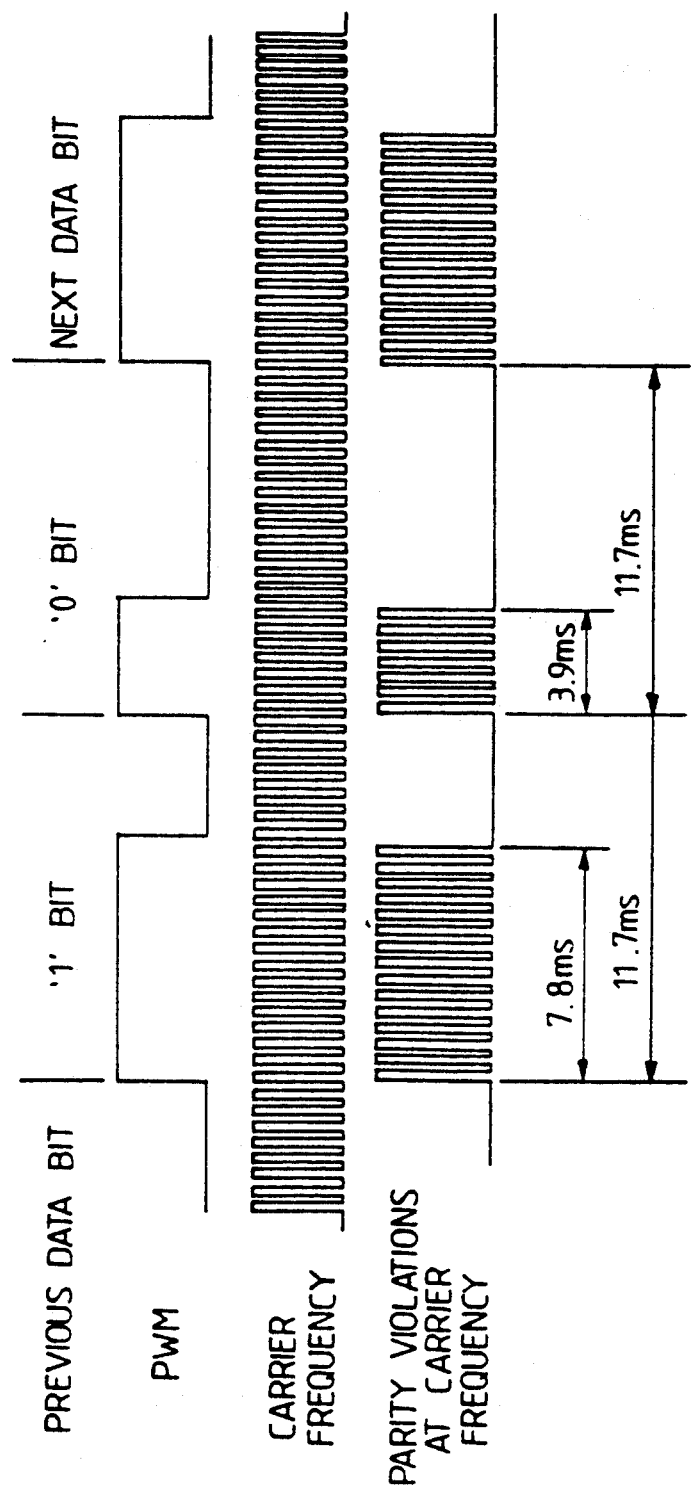
FIG. 3 illustrates pulse width modulation of carrier tones.

The system optical receiver 15 feeds the received signalling data to a test sequence receiver 6. These signals having passed through the looped-back system and received in test sequence receiver 16 via the optical receiver 15 should contain the same errors as were imposed on the test sequence at the source 11. A clock derived from the received optical signals is fed to a phase detector 17 which provides a clock control for the test sequence receiver 16. The phase detector also provides an output which carries telemetry and other signalling from the repeaters and feeds this output to the supervisory controller 13. The return signalling method used in this example is one of phase modulation to the clock, as shown in FIG. 3.

Figure 2:
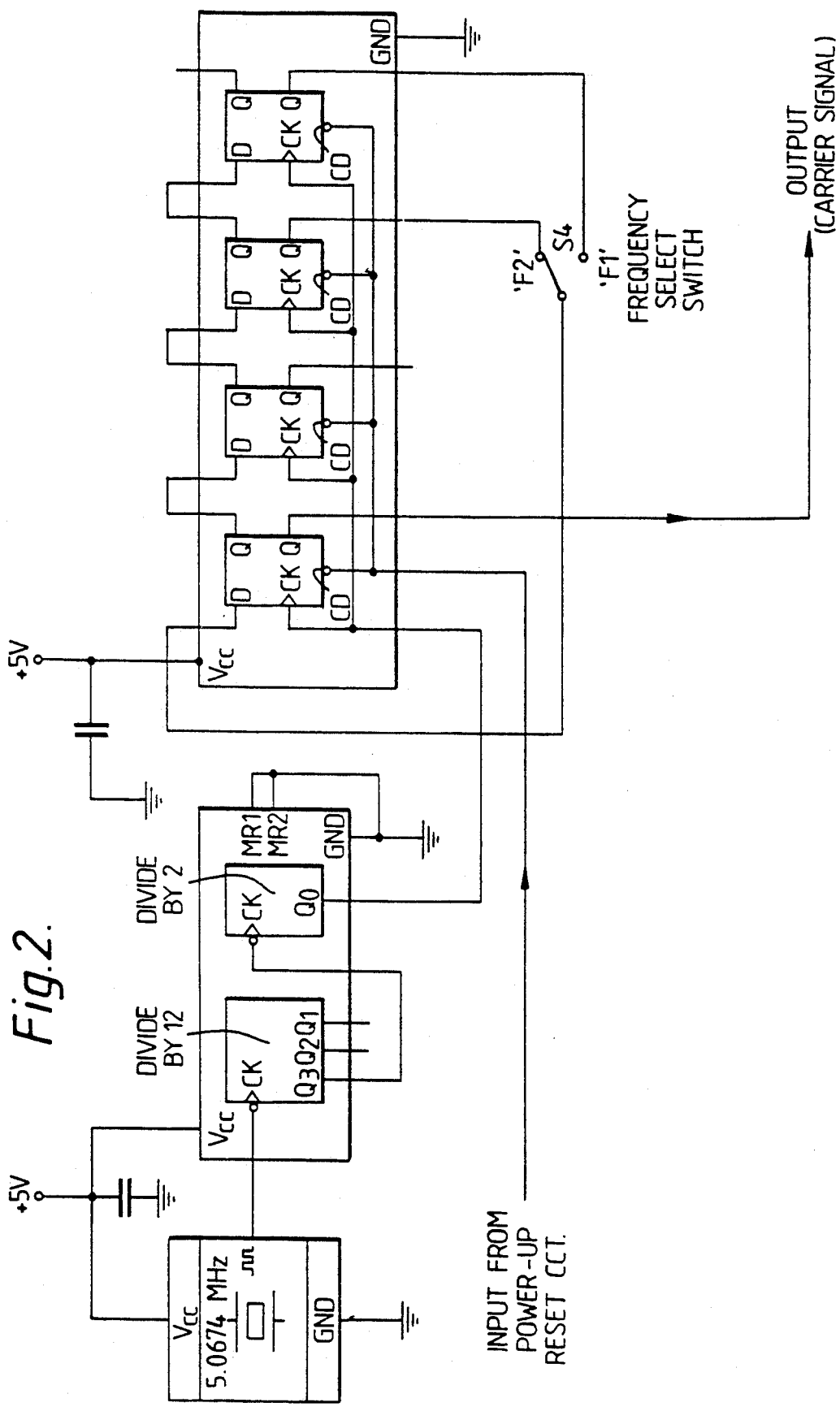
FIG. 2 is a schematic of a carrier signal generator.

As mentioned above, the system utilises two different tones for the two directions of data transmission. Thus, depending on which end of the system the supervisory controller is situated the interface 14 will be required to produce one or other of the two tones for the supervisory signalling. For practical purposes it is desirable that the required tone be selected by simple switching from a single local oscillator. FIG. 2 shows such an arrangement. A crystal oscillator running at 5.0674 MHz feeds a divide- by-12 counter 21. After a further division by 2 the output is applied to a quad D-type flip-flop 22 which acts as either a modulo 8 or a modulo 6 counter depending on which stage provides feedback to the first stage, depending on selection of the appropriate flip-flop output via switch S4. Thus using switch S4 either frequency F1=52.785 kHz or frequency F2=70.381 kHz is provided at the output of stage 1. The output carrier signal is fed via a further switch S3 to a PWM modulator operating in accordance with the required supervisory signalling code. Switch S3 is included to allow an external carrier signal from another source to be used instead of F1 or F2. It is to be noted that F1 and F2 are each in fact twice the tone frequency required in the repeaters. This is because, as noted above, the signals received in each repeater are initially passed through a divide-by-2 circuit.

To communicate with a repeater, deliberate parity violations are injected into the transmissions of the test sequence. The deliberate parity violations are controlled by pulse generator 20 the output of which is superimposed on the supervisory signalling code from controller 13. This causes a false parity violation to be sent after the appropriate 24-bit block of data. To send information to a regenerator the parity violations must be sent at a periodic rate. Data is therefore recognised in the repeater as pulse width modulated tones. FIG. 3 illustrates PWM modulation of the F1 and F2 carrier. Each PWM bit is 11.7 ms in duration. A binary 1 is transmitted as 7.8 ms of tone (carrier) followed by 3.9 ms of silence (no carrier). A binary 0 is the inverse of the binary 1.

The PWM modulated signal output of the interface 14 is applied to the bit sequence source 11 and to an error counter 18 where the number of injected errors is counted to provide a monitoring facility. A similar counter 19 coupled to the PWM output of the test sequence receiver 16 will count the errors received from the system. Comparison of the counts in counters 18 and 19 will indicate the satisfactory operation or otherwise of the system. Any desired 24-bit block can be used, for example a simple alternating 010101 ... 0101 sequence, followed by a single parity bit, will suffice. Simple inversion of one of the 24 bits, or of the parity bit, will provide the necessary deliberate error.

We claim:

1. An arrangement for signalling to supervisory equipment in a repeater in a digital transmission system, the arrangement including:
    a) means for generating a digital data test sequence comprising a plurality of multi-bit words each accompanied by a parity check bit;
    b) means for transmitting said test sequence in the transmission system;
    c) means for generating digital supervisory signals, and
    d) means for imposing periodic parity violation errors on the test sequence in accordance with said supervisory signals whereby said supervisory signals modulate the error containing test sequence, said arrangement further including
    e) means for detecting and for counting the periodic parity violations imposed on the test sequence, and
    f) means for detecting and for counting periodic parity errors in the test sequence returned from the system.

2. An arrangement according to claim 1 wherein said digital supervisory signals are pulse width modulated signals.

3. An arrangement according to claim 1 including means for selectively generating at least two different rate clock signals, said periodic inversions of bits being imposed at the selected clock rate.

4. An arrangement according to claim 3 wherein the means for selectively generating alternative rate clock signals comprises a stable crystal oscillator, a first fixed divider circuit to which the oscillator output is applied, a multiple flip-flop counter arrangement to which the divider circuit output is applied, and a selector switch the operation of which selects an output from one or other of the flip-flops in the counter.

5. A method of signalling to supervisory equipment in a repeater in a digital transmission system, the method including the steps of:
    a) generating a digital data test sequence comprising a plurality of multi-bit words each accompanied by a parity check bit;
    b) feeding said test sequence to the transmission system;
    c) generating digital supervisory signals, and
    d) imposing periodic parity violation errors on the test sequence in accordance with said supervisory signals, said supervisory signals modulating the error containing test sequence,
    e) counting the periodic parity violations imposed on the test sequence, and
    f) counting the periodic parity errors in the test sequence returned from the system.

6. An arrangement according to claim 2 including means for selectively generating at least two different rate clock signals, said periodic inversions of bits being imposed at the selected clock rate.

7. An arrangement according to claim 6 wherein the means for selectively generating alternative rate clock signals comprises a stable crystal oscillator, a first fixed divider circuit to which the oscillator output is applied, a multiple flip-flop counter arrangement to which the divider circuit output is applied, and a selector switch the operation of which selects an output from one or other of the flip-flops in the counter.

* * * * *